(12) United States Patent
Stenneth

(10) Patent No.: US 9,606,218 B2
(45) Date of Patent: Mar. 28, 2017

(54) ROUTE VERIFICATION FROM WIRELESS NETWORKS

(71) Applicant: HERE Global B.V., Veldhoven (NL)

(72) Inventor: Leon Stenneth, Chicago, IL (US)

(73) Assignee: HERE Global B.V., Eindhoven (NL)

( * ) Notice: Subject to any disclaimer, the term of this patent is extended or adjusted under 35 U.S.C. 154(b) by 97 days.

(21) Appl. No.: 13/951,740

(22) Filed: Jul. 26, 2013

(65) Prior Publication Data

US 2015/0032367 A1   Jan. 29, 2015

(51) Int. Cl.
| G01C 21/34 | (2006.01) |
| G01S 5/02 | (2010.01) |
| G01C 21/20 | (2006.01) |
| G01C 21/32 | (2006.01) |

(52) U.S. Cl.
CPC ........... G01S 5/0294 (2013.01); G01C 21/20 (2013.01); G01C 21/32 (2013.01); G01C 21/34 (2013.01); G01S 5/0252 (2013.01)

(58) Field of Classification Search
CPC ....... G01S 19/215; G01C 21/20; G01C 21/34; H04W 4/008
USPC ............ 701/300, 410, 430; 455/41.2, 550.1; 342/357.59, 357.64; 370/328
See application file for complete search history.

(56) References Cited

U.S. PATENT DOCUMENTS

| 5,754,657 | A | * | 5/1998 | Schipper | G01S 19/16 |
| | | | | | 342/357.29 |
| 7,956,803 | B2 | * | 6/2011 | Thomson | G01S 19/215 |
| | | | | | 342/357.58 |
| 2008/0086321 | A1 | * | 4/2008 | Walton | G06F 17/30309 |
| | | | | | 705/342 |
| 2009/0265105 | A1 | * | 10/2009 | Davis | G01C 21/20 |
| | | | | | 701/300 |
| 2009/0315766 | A1 | * | 12/2009 | Khosravy | G06Q 30/0241 |
| | | | | | 342/357.64 |
| 2010/0324813 | A1 | * | 12/2010 | Sundararajan | G01C 21/20 |
| | | | | | 701/532 |
| 2011/0077862 | A1 | * | 3/2011 | Huang | G01C 21/30 |
| | | | | | 701/532 |
| 2011/0182238 | A1 | * | 7/2011 | Marshall | H04W 64/00 |
| | | | | | 370/328 |
| 2013/0162481 | A1 | * | 6/2013 | Parvizi | G01S 3/023 |
| | | | | | 342/452 |

(Continued)

FOREIGN PATENT DOCUMENTS

| EP | 2397868 | 12/2011 |
| WO | WO2007083270 | 7/2007 |

OTHER PUBLICATIONS

Meyer, David, "Google explains why Street View cars record Wi-Fi data", Apr. 28, 2010, http://www.zdnet.com/article/google-explains-why-street-view-cars-record-wi-fi-data/.*

(Continued)

Primary Examiner — Thomas G Black
Assistant Examiner — Wae Louie
(74) Attorney, Agent, or Firm — Lempia Summerfield Katz LLC

(57) ABSTRACT

Determination of route completion from wireless network data is presented. A recording is performed of data associated with wireless devices while traveling. The recording is compared to an expected recording of data associated with wireless networks along a route. Execution of the route is then proven based on the comparison.

20 Claims, 6 Drawing Sheets

(56) References Cited

U.S. PATENT DOCUMENTS

| | | | | |
|---|---|---|---|---|
| 2013/0196601 A1* | 8/2013 | Bobrow | ................... | H04B 7/24 |
| | | | | 455/41.2 |
| 2013/0260791 A1* | 10/2013 | Malinovskiy | ........... | H04W 4/02 |
| | | | | 455/456.1 |
| 2014/0364164 A1* | 12/2014 | Griffin | ............. | H04N 21/42201 |
| | | | | 455/550.1 |
| 2014/0370816 A1* | 12/2014 | Bobrow | ................... | H04B 7/24 |
| | | | | 455/41.2 |
| 2015/0032367 A1* | 1/2015 | Stenneth | ................ | G01C 21/34 |
| | | | | 701/430 |
| 2015/0245167 A1* | 8/2015 | Bobrow | ................ | H04W 4/008 |
| | | | | 455/41.2 |

OTHER PUBLICATIONS

Leiteritz, Raphael, "Google's submission today to several national data protection authorities on vehicle-based collection of wifi data for use in Google location based services", Apr. 27, 2010, http://static.googleusercontent.com/external_content/untrusted_dlcp/www.google.com/en//googleblogs/pdfs/google_submission_dpas_wifi_collection.pdf.*

International Search Report and Written Opinion cited in EP14172858.4, mailed Sep. 17, 2015.

* cited by examiner

ROUTE VERIFICATION FROM WIRELESS NETWORKS

FIELD

The following disclosure relates to route verification systems and route verification related applications, and more specifically to verifying a route using wireless network data.

BACKGROUND

There are numerous instances of organizations such as package delivery companies, waste disposal companies, utility service companies, human transit organizations, and many others, which involve route based fleet operations. The fleet based operations involve multiple vehicles or individual resources being dispatched on routes throughout geographic areas and territories. These routes may be designated or predetermined routes for a particular resource. The resources are then charged with completing the route, typically within a scheduled timeframe. Often the dispatched resources are allowed to independently verify that the route was completed.

It is important, however, to be able to verify that a route is taken by a resource to help ensure that the intended locations are visited by the resource. If a resource deviates from the intended route, aside from potentially missing assigned locations, the modified route may also be a less efficient route and cause an inefficient use of resources.

SUMMARY

In an embodiment, a method involves recording data associated with wireless networks encountered on a trip. The data associated with wireless networks is compared to a standard recording of wireless networks along a route. A similarity measure is determined based on the comparing of the data associated with wireless networks to the standard recording of wireless networks. It is then determined whether the route is taken by a traveler based on the similarity measure.

In an embodiment, an apparatus involves a memory configured to store a recording of data associated with wireless networks encountered on a trip and a standard recording of data associated with wireless networks for a route. The apparatus also involves a controller configured to compare the recording to the standard recording to determine a similarity measure, and using the similarity measure to validate whether the route is traveled.

In an embodiment, a non-transitory computer readable medium may contain instructions that when executed are operable to record a list of wireless networks encountered while traveling. The instructions are also operable to perform a comparison of the list to a master list of wireless networks determined for a route. The instructions are then operable to prove execution of the route using the comparison.

BRIEF DESCRIPTION OF THE DRAWINGS

Exemplary embodiments of the present invention are described herein with reference to the following drawings.

DETAILED DESCRIPTION

Completion of a route can be verified with existing infrastructure, and without specific position data, by scanning and recording the wireless networks and data associated with those networks while a traveler is on a trip. This recorded data may be considered a scan list. The data recorded by the traveler on the trip can be compared to an expected set of data for wireless networks along a defined route, and indicates whether the traveler traversed the route during the trip. This type of determination can be performed in a batch mode or a real-time mode. In a batch mode implementation the entire trip is completed, then the recorded data is uploaded after the trip, and a determination as to whether the trip matched the route may be performed after the trip. In a real-time mode implementation recorded data can be uploaded during the trip, and a determination as to whether the trip matches the route may be made during the trip. The recorded data does not necessarily match the expected data entirely to verify the completion of a route, but that a similarity or distance measure may be used to make that determination.

Figure 1:
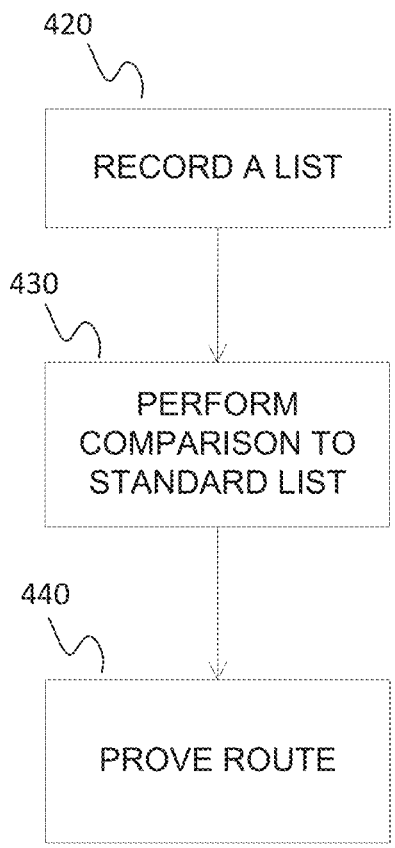
FIG. 1 illustrates an exemplary route verification method.

FIG. 1 illustrates an exemplary route verification method. At act 420, a list of wireless networks encountered while traveling is recorded. The wireless networks may include any type of wireless network, including wireless communication networks. For example, any combination of personal area networks, local area networks, metropolitan area networks, mesh networks, wide area networks, cellular networks, or other mobile networks may be encountered.

At act 430, a comparison is performed of the list of wireless networks encountered in act 420 to a master list of wireless networks determined for a route. The route may be a predetermined route based on a specific geographic path assigned to a traveler. The route may involve stops or designated geographic points that should be attended by the traveler. The stops may also have a required order of attendance that may partially, or completely, define a route. The route has wireless networks within a communicable distance at various areas of the route. Data may be recorded that describes the communication with the wireless networks, such as network type, network name, wireless signal strength, and time of communication or communicable identification with the wireless networks. Other data from the wireless networks may be recorded as well. The recorded data may be recorded in a list. The master list of wireless networks may be determined from a trip that involved recording the recorded data along the route. The master list may also be a combination of data recorded over multiple trips along the route.

In an embodiment, the comparison performed involves measuring a similarity between the list and the master list. The similarity may be measured using any method, such as methods used in the area of string metrics. For example, an edit distance determination can be made between the two lists. Also, Hamming distance, Levenshtein distance, or Damerau-Levenshtein distance may be used to measure the similarity between the two lists. For example, a Hamming distance may be determined between two strings of equal length as the number of positions at which the corresponding symbols are different. Also, a Damerau-Levenshtein distance is given by counting the minimum number of operations needed to transform one string of text into the other, where an operation is defined as an insertion, deletion, or substitution of a single character, or a transposition of two adjacent characters.

At act 440, the execution of a route is proven using the comparison performed in act 430. The execution of a route may be proven using any method based on the comparison.

In an embodiment, the measured similarity between the list and the master list is compared to a threshold value of similarity to prove the execution of a route. For example, if the measured similarity is above the threshold value, the execution of the route may be proven. Contrarily, if the measured similarity is below the threshold value, the execution of the route may not be proven.

Figure 2:
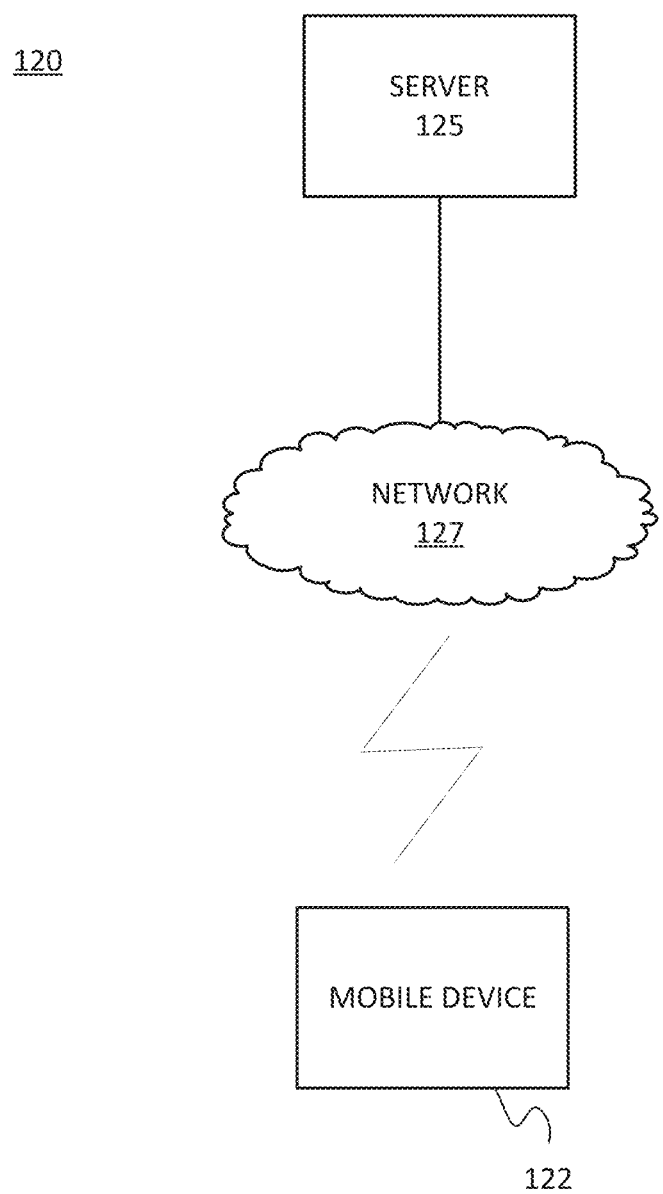
FIG. 2 illustrates an exemplary networked model route verification system.

FIG. 2 illustrates an exemplary networked model route verification system 120. The route verification system 120 includes a server 125, a mobile device 122, and a network 127. Additional, different, or fewer components may be provided. For example, many mobile devices 122 may connect with the network 127.

The server 125 and the mobile device 122 are coupled with the network 127. The phrase "coupled with" is defined to mean directly connected to or indirectly connected through one or more intermediate components. Such intermediate components may include hardware and/or software-based components.

The mobile device 122 includes one or more detectors or sensors built or embedded into or within the interior of the mobile device 122. The mobile device 122 may communicate data from the sensors via the network 127 to the server 125. The mobile device 122 may also communicate other data with the server 125. This other data may include a recording of data associated with wireless networks encountered on a route. Also, the server 125 may communicate a standard recording of data associated with wireless networks for a route to the mobile device 122. In an embodiment, the mobile device 122 can communicate directly with the server 125.

The computing resources for recording, comparing, and determining may be divided between the server 125 and the mobile device 122. In some embodiments, the server 125 performs a majority, or all, of the processing. In other embodiments, the mobile device 122 performs a majority, or all, of the processing. In addition, the processing is divided substantially evenly between the server 125 and the mobile device 122.

The network 127 may include wired networks, wireless networks, or combinations thereof. The wireless network may be a cellular telephone network, an 802.11 (WiFi), 802.16, 802.20, or WiMax network. Further, the network 127 may be a public network, such as the Internet, a private network, such as an intranet, or combinations thereof, and may utilize a variety of networking protocols now available or later developed including, but not limited to Transmission Control Protocol or Internet Protocol (TCP/IP) based networking protocols.

Figure 3:
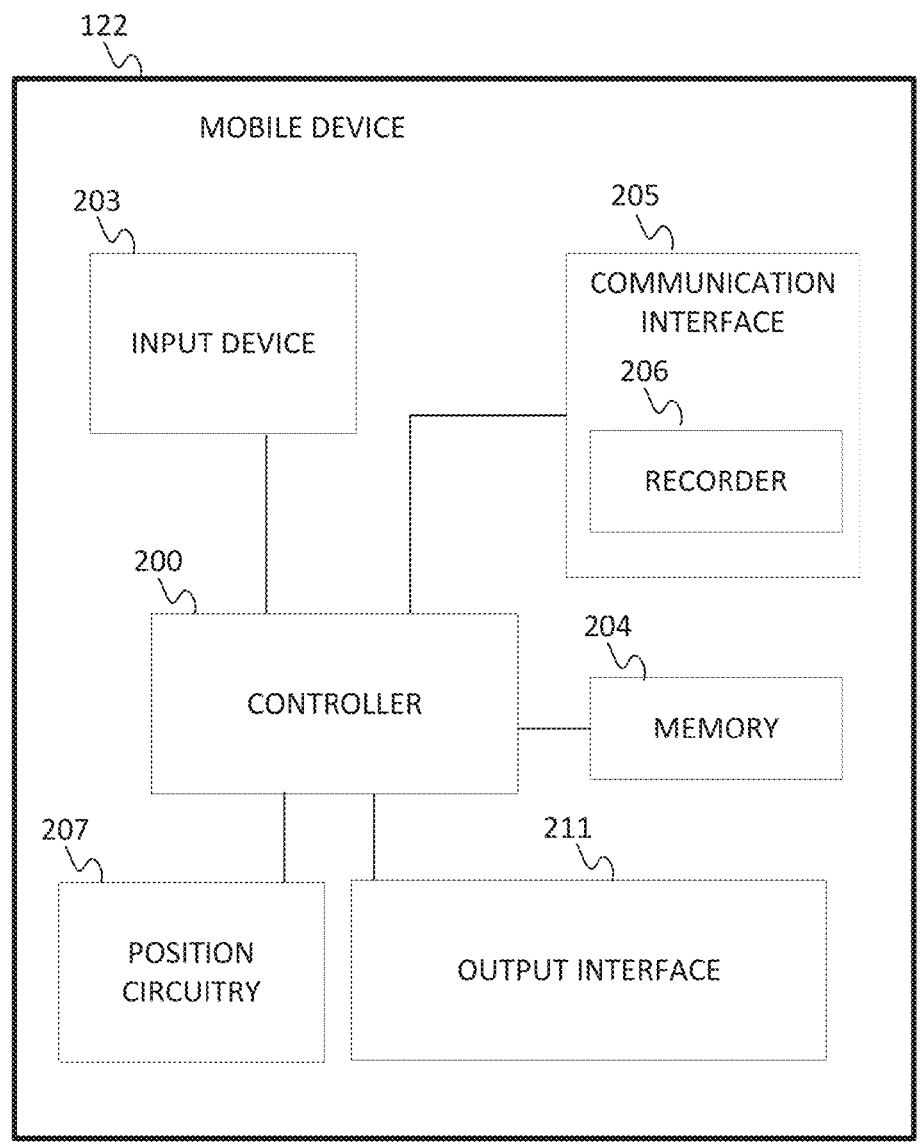
FIG. 3 illustrates an exemplary mobile device for route verification.

FIG. 3 illustrates an exemplary mobile device 122 for route verification. The mobile device 122 includes a controller 200, a memory 204, an input device 203, a communication interface 205, a wireless network data recorder 206, position circuitry 207, and an output interface 211. The output interface 211 may present visual or non-visual information such as audio information. Additional, different, or fewer components are possible for the mobile device 122. The mobile device 122 is a smart phone, a mobile phone, a personal digital assistant (PDA), a tablet computer, a notebook computer, a personal navigation device (PND), a portable navigation device, a camera, and/or any other known or later developed mobile device. The positioning circuitry 207, which is an example of a positioning system, is configured to determine a geographic position of the mobile device 122.

The positioning circuitry 207 may include suitable sensing devices that measure the traveling distance, speed, direction, orientation, and so on, of the mobile device 122. The positioning system may also include a receiver and correlation chip to obtain a Global Positioning System (GPS) signal, though some embodiments may not require a GPS signal. Alternatively or additionally, the one or more detectors or sensors may include accelerometers, gyroscopes, and/or magnetic sensors built or embedded into or within the interior of the mobile device 122. The accelerometer is operable to detect, recognize, or measure the rate of change of translational and/or rotational movement of the mobile device 122. The gyroscope is configured to generate data indicative of an angle of orientation of the mobile device 122, with regards to a reference plane or horizon reference. The angle of orientation may be considered a multi-axis tilt measurement. The magnetic sensor, or a compass, is configured to generate data indicative of a heading, or cardinal direction bearing, of the mobile device 122. Data from the accelerometer, the gyroscope, and the magnetic sensor may indicate orientation of the mobile device 122. The mobile device 122 receives location data from the positioning system. The location data indicates the location of the mobile device 122. Any data from the mobile device 122 may be associated with wireless networks in communicable distance of the mobile device 122.

The positioning circuitry 207 may include a GPS, Global Navigation Satellite System (GLONASS), or a cellular or similar position sensor for providing location data. The positioning system may utilize GPS-type technology, a dead reckoning-type system, cellular location, or combinations of these or other systems. The positioning circuitry 207 may include suitable sensing devices that measure the traveling distance, speed, direction, and so on, of the mobile device 122. The positioning system may also include a receiver and correlation chip to obtain a GPS signal. The mobile device 122 receives location data from the positioning system. The location data indicates the location of the mobile device 122.

Location data may have spatial and temporal elements. For example, the controller 200 may associate a specific time that a position of mobile device 122 was determined using the position circuitry 207. This specific time may be associated with the determined position and saved as location data in memory 204, or transmitted to server 120. Location data with a temporal element may be considered time stamped. The controller 200 may also time stamp other data, such as data associated with wireless networks received through the communication interface 205.

The input device 203 may be one or more buttons, keypad, keyboard, mouse, stylist pen, trackball, rocker switch, touch pad, voice recognition circuit, or other device or component for inputting data to the mobile device 122. The input device 203 and the output interface 211 may be combined as a touch screen, which may be capacitive or resistive. The output interface 211 may be a liquid crystal display (LCD) panel, light emitting diode (LED) screen, thin film transistor screen, or another type of display. The output interface 211 may also include audio capabilities, or speakers.

The controller 200 may include a general processor, digital signal processor, an application specific integrated circuit (ASIC), field programmable gate array (FPGA), analog circuit, digital circuit, combinations thereof, or other now known or later developed processor. The controller 200 and may be a single device or combinations of devices, such as associated with a network, distributed processing, or cloud computing.

The memory 204 may be a volatile memory or a non-volatile memory. The memory 204 may include one or more of a read only memory (ROM), random access memory (RAM), a flash memory, an electronic erasable program read only memory (EEPROM), or other type of memory. The memory 204 and may be removable from the mobile device 100, such as a secure digital (SD) memory card.

The communication interface 205 may include any operable connection. An operable connection may be one in which signals, physical communications, and/or logical communications may be sent and/or received. An operable connection may include a physical interface, an electrical interface, and/or a data interface. The communication interface 205 and/or communication interface 305 provides for wireless and/or wired communications in any now known or later developed format.

In an embodiment, route verification occurs without the use of a GPS signal, or other location identification. The mobile device 122 may verify a route by receiving wireless network data through the communication interface 205, and comparing the recorded wireless network data to a standard recording of data associated with wireless networks for a route using the controller 200. The controller 200 may be further configured to determine a similarity measure based on the comparison to validate whether the route is traveled. A similarity threshold may be used by the controller 200 to gauge the similarity measure and validate whether the route is traveled. The controller 200 may be further configured to generate an alert when the similarity measure is below a minimum similarity threshold. The alert may be broadcast through the output interface 211, or the alert may be communicated using the communication interface 205 to a server or other device external to the mobile device 122. An embodiment may use the recorder 206 to record wireless network data on the memory 204.

In an embodiment, a vehicle may be assigned to a route. A mobile device 122 may be associated with the vehicle. The mobile device 122 may be used to validate whether the route assigned to the vehicle was traveled by recording data associated with wireless networks while the vehicle is traveling. The data associated with the wireless networks recorded by the mobile device 122 may then be compared to a standard recording of data associated with wireless networks for the route to determine a similarity measure. The similarity measure may be used to validate whether the route was traveled.

Figure 4:
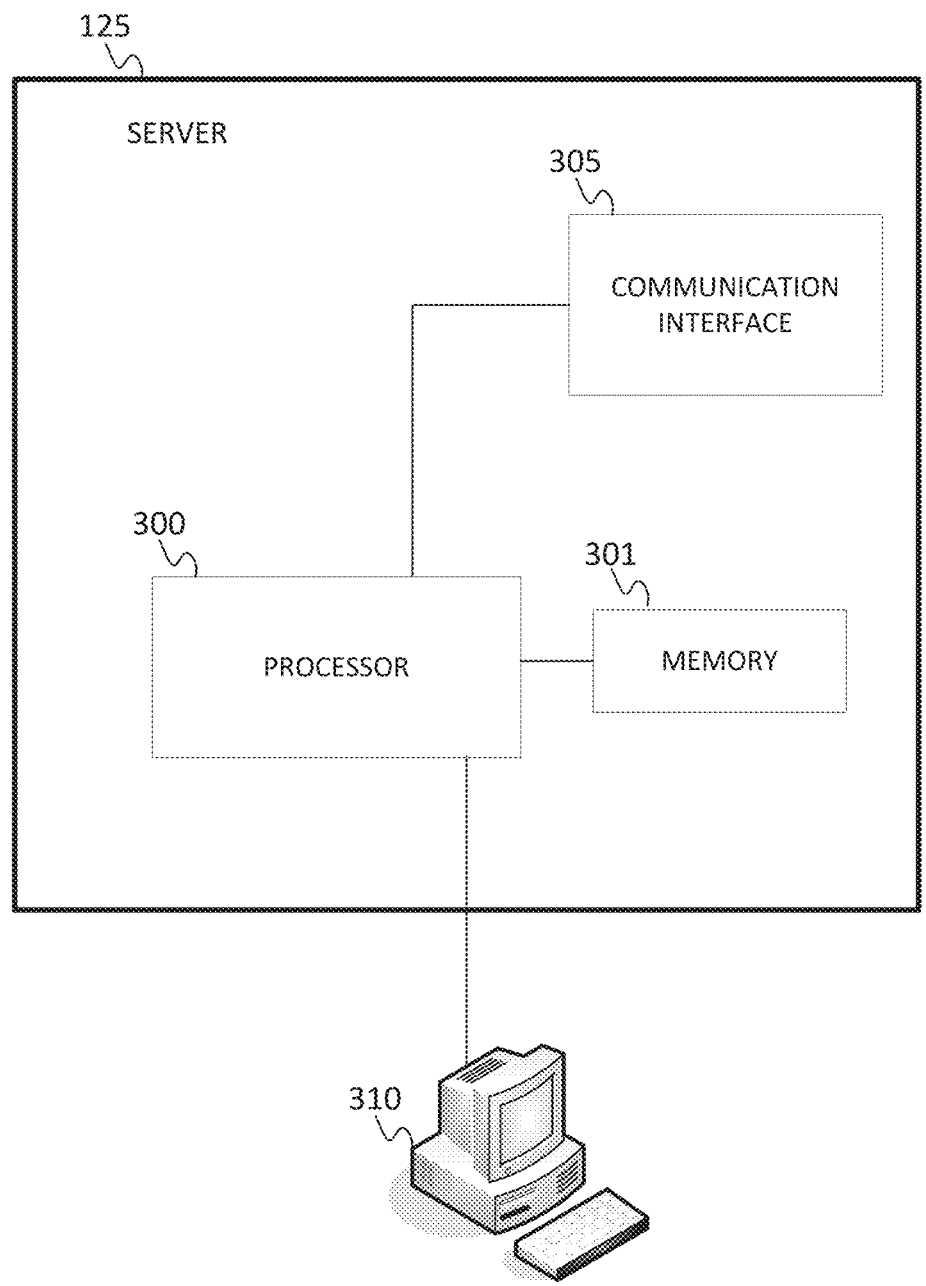
FIG. 4 illustrates an exemplary server for route verification.

FIG. 4 illustrates an exemplary server 125 for route verification. The server 125 includes a processor 300, a communication interface 305, and a memory 301. The server 125 may be coupled to a workstation 310. The workstation 310 may be used as an input device for the server 125. In addition, the communication interface 305 is an input device for the server 125. The communication interface 305 receives data indicative of inputs made via the mobile device 122.

The processor 300 may include a general processor, digital signal processor, ASIC, FPGA, analog circuit, digital circuit, combinations thereof, or other now known or later developed processor. The processor 300 may be a single device or combinations of devices, such as associated with a network, distributed processing, or cloud computing.

The memory 301 may be a volatile memory or a non-volatile memory. The memory 301 may include one or more of a read only memory (ROM), random access memory (RAM), a flash memory, an electronic erasable program read only memory (EEPROM), or other type of memory. The memory 301 may be removable from the mobile device 100, such as a secure digital (SD) memory card.

The communication interface 305 may include any operable connection. An operable connection may be one in which signals, physical communications, and/or logical communications may be sent and/or received. An operable connection may include a physical interface, an electrical interface, and/or a data interface. The communication interface 305 provides for wireless and/or wired communications in any now known or later developed format.

In an embodiment the memory 301 is configured to store a recording of data associated with wireless networks encountered on a route and a standard recording of data associated with wireless networks for the route. Also, in the embodiment, the processor 300 is configured to compare the recording to the standard recording to determine a similarity measure. The processor 300 is also configured to use the similarity measure to validate whether the route is traveled. The processor 300 may be further configured to determine whether the similarity measure is above a minimum similarity threshold, then use this determination to validate whether the route is traveled. The processor 300 may be further configured to generate an alert when the similarity measure is below the minimum similarity threshold.

In an embodiment, the memory 301 and the processor 300 are located remotely from a recorder configured to record data associated with wireless networks. The recorder may be a recorder 206 of a mobile device 122, and the data may be communicated from the mobile device 122 to the server 125 via the communication interface 305. In an embodiment, the mobile device 122 with the recorder 206 may be associated with a vehicle assigned to a route.

Figure 5:
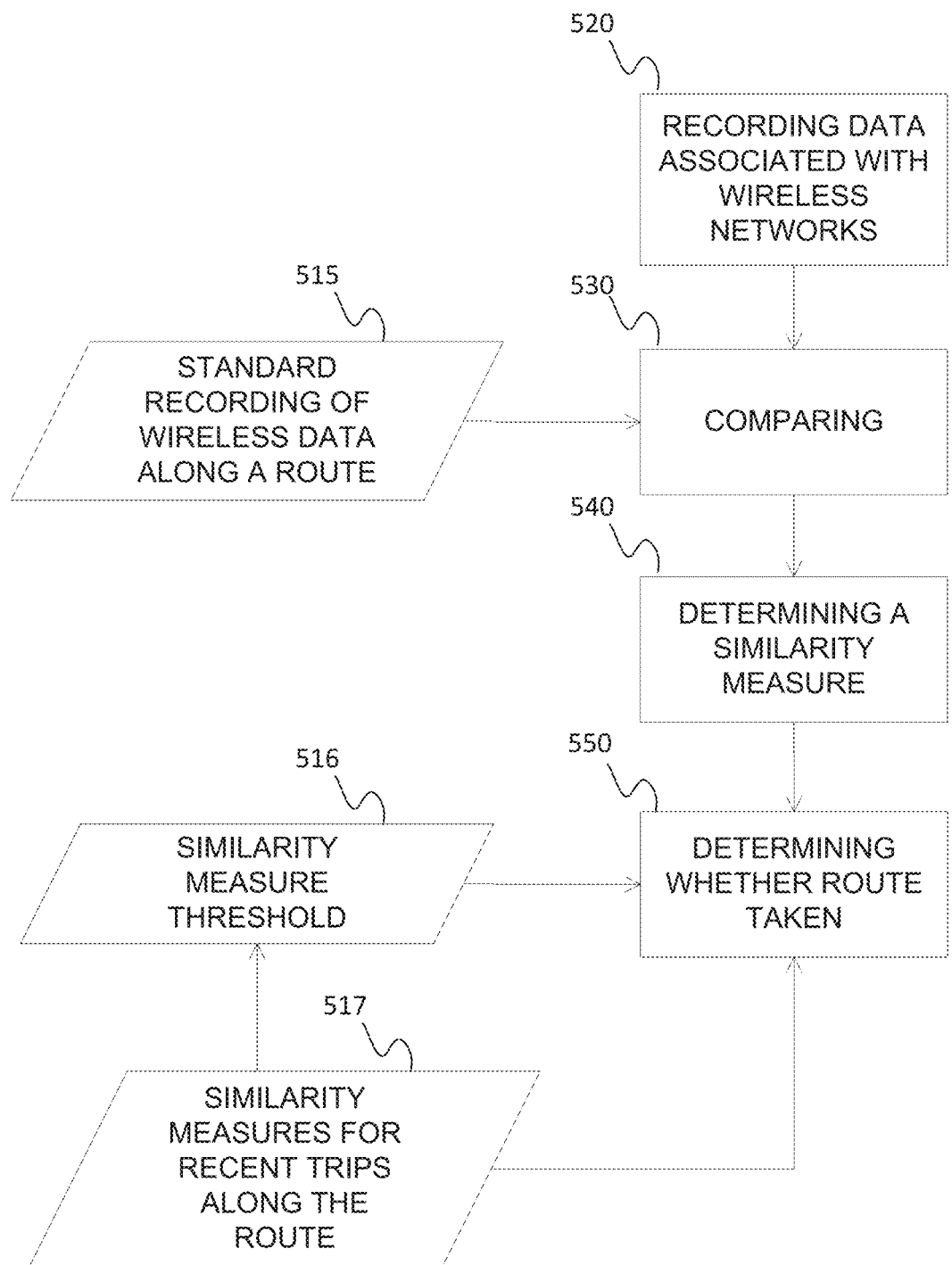
FIG. 5 illustrates an example flowchart for route verification.

FIG. 5 illustrates an example flowchart for route verification. As presented in the following sections, the term controller may refer to either controller 200 or processor 300 and the following acts may be performed by mobile device 122, server 125, or a combination thereof. Additional, different, or fewer acts may be provided. Mobile data may refer to wireless network data, data relating to wireless networks, data associated with wireless networks, or other data originating or sent from a mobile unit. The acts are performed in the order shown or other orders. The acts may also be repeated.

At act 520 data associated with wireless networks encountered on a trip is recorded. The data recorded may be any data associated with a wireless network. For example, a name of the wireless network, the wireless signal strength, or a wireless network type, such as WiFi, Bluetooth®, or cellular network, may be associated with a wireless network and recorded. Other data may also be associated with the wireless networks based on sensor readings while the wireless network is detected. For example, if a mobile device is used to record wireless networks, then acceleration, orientation, and time readings may also be associated with the encountered wireless network. Further, in an embodiment, associated data may include a time the wireless networks were within communicable distance or a velocity of the traveler when the data associated with the wireless networks were recorded.

The wireless networks may be encountered as a traveler travels through a geographic area, and recorded by a device associated with the traveler. Multiple wireless networks may be encountered and recorded at the same time. Also, there may be a time period during a trip when no wireless networks are encountered, and a time of no contact with wireless networks is recorded.

At act 530, the data associated with wireless networks recorded in act 520 is compared to a standard recording of wireless networks along a route 515. The route may involve a designated path through a geographic area. A route may also involve a collection of required stops at specific geographic locations, which may have a designated order in which the stops may be performed. For example, a route may be assigned to the operator of a postal vehicle. Also, a route may be assigned to a pedestrian such as a walking post-delivery person. The route may involve multiple locations which need to be attended to either deliver or pick up post. If a location is not attended, a location will not be serviced. The route may also be composed of individual segments, that when taken as a whole, are considered the route.

The encountered recording and the standard recording may involve recordings of the same categories of data associated with wireless networks. For example, the encountered recording and the standard recording may both record a network type, network name, and a signal strength for wireless networks. The encountered recording and the standard recording may also contain different data categories, but compare similar data categories. For example, the encountered recording may involve a wireless network name, speed of traveler while recording wireless network, and a signal strength, whereas the standard recording may involve a wireless network category, a wireless network name, a signal strength, and a time within communicable distance of the wireless network. In such an embodiment, the similar categories of wireless network name and signal strength may be compared.

The standard recording of wireless networks along a route 515 may be developed or determined while traveling an intended route and recording the wireless networks along the route. This may be performed by a traveler with a mobile device that is configured to record encountered data associated with wireless networks. This standard recording may be considered a determination of what the wireless data recorded along a route should look like. As there are non-permanent wireless networks, such as some mobile WiFi hotspots broadcast from mobile devices, there may be portions of recordings of wireless networks encountered on a trip that also include these non-permanent wireless networks. To account for this, the standard recording may also involve the combination of multiple trips along the route to better establish permanent wireless networks and data associated with the networks along the route. Further, by recording a time of communicable distance and other types of data associated with wireless networks, a wireless network recording signature may be developed. This signature recording may help to characterize a route by the encountered wireless networks. For example, if at a certain point in a route, a signal strength for a WiFi network is strong, and that strength is recorded, subsequent trips along the route will tend to include the same WiFi network and similar signal strength. If specific wireless networks and data associated with the wireless networks can be determined to be consistent through multiple route trips, that wireless network and associated data may be considered a waypoint, or essential network, for the route. In an embodiment, a standard recording may be composed of wireless network waypoints for the route. The comparing act 530 may then involve only a comparison of the waypoints recorded in the standard recording and the waypoints existent in the recording of act 520. The standard recording may consist of standard segment recordings, or segmented recordings, of data associated with wireless networks along particular segments of the route.

At act 540 a similarity measure based on the comparing of the data associated with encountered wireless networks to the standard recording of wireless networks of act 530 is determined. The similarity measure may be any similarity measure capable of qualifying or quantifying the similarity of the recordings. In an embodiment, the similarity measure may be a metric that measures similarity or dissimilarity between two texts or text strings. For example, the metric may involve using algorithms such as an edit distance, or other algorithms or techniques such as Hamming distance, Bamerau-Levenshtein distance, Needleman-Wunsch distance, Smtih-Waterman distance, Jaro-Winkler distance, a simple matching coefficient (SMC), Jaccard similarity, Lee distance, or any other similarity measure.

In an embodiment involving a Levenshtein distance algorithm, two textual strings are compared to determine a similarity measure. The textual strings represent the data recorded and associated with wireless networks in act 520 and the standard recording of wireless data along a route 515. The Levenshtein distance algorithm involves determining the Levenshtein distance between two textual strings as the minimum number of single-character edits (insertion, deletion, substitution) required to change one textual string into the other.

At act 550 it is determined whether the route is taken by a traveler based on the similarity measure determined in act 540. The determination may be made based on quantifiable or qualified consideration of the similarity measure. For example, the similarity measure may be determined to be within a certain range of similarity measures of other recent recordings 517 of data associated with wireless networks for assigned trips along the same route. In another embodiment, a similarity measure threshold 516 may be determined that indicates the minimum similarity measure considered to have proven that the route was taken. If the similarity measure passes the threshold, the trip may be considered a trip along the route. In an embodiment, the similarity measure threshold 516 may be determined from the similarity measures for recent trips along the route 517. In an embodiment, both the similarity measure threshold 516 and the similarity measures for recent trips along the route 517 may be used to determine if the route is taken in act 550. A determination whether the route was taken may also be performed for each segment of a route. In an embodiment, certain segments of the route may need to be determined as taken to determine whether the entire route is taken. In another embodiment, all segments must be determined taken to determine that the route is taken.

In an embodiment, acts 520, 530, 540, and 550 may occur while or after a traveler is traveling on a trip intended to be a trip along the route. For example, the traveler may be scheduled to travel the route at a specific day and time and a determination on whether the correct route is taken in act 550 can be performed at any time during the specific scheduled time and day for the route. The determining of act 550 may be performed continuously or periodically throughout the scheduled performance of the route, and an alarm indicating that the traveler is no longer following the route may be generated when it is determined that the traveler is no longer traveling the route. The alarm may be communicated to the traveler, or to people or systems charged with route completion oversight. In another embodiment, acts 520, 530, 540, and 550 may occur after a scheduled completion of the route, or as a verification that the route was taken by a traveler.

Figure 6:
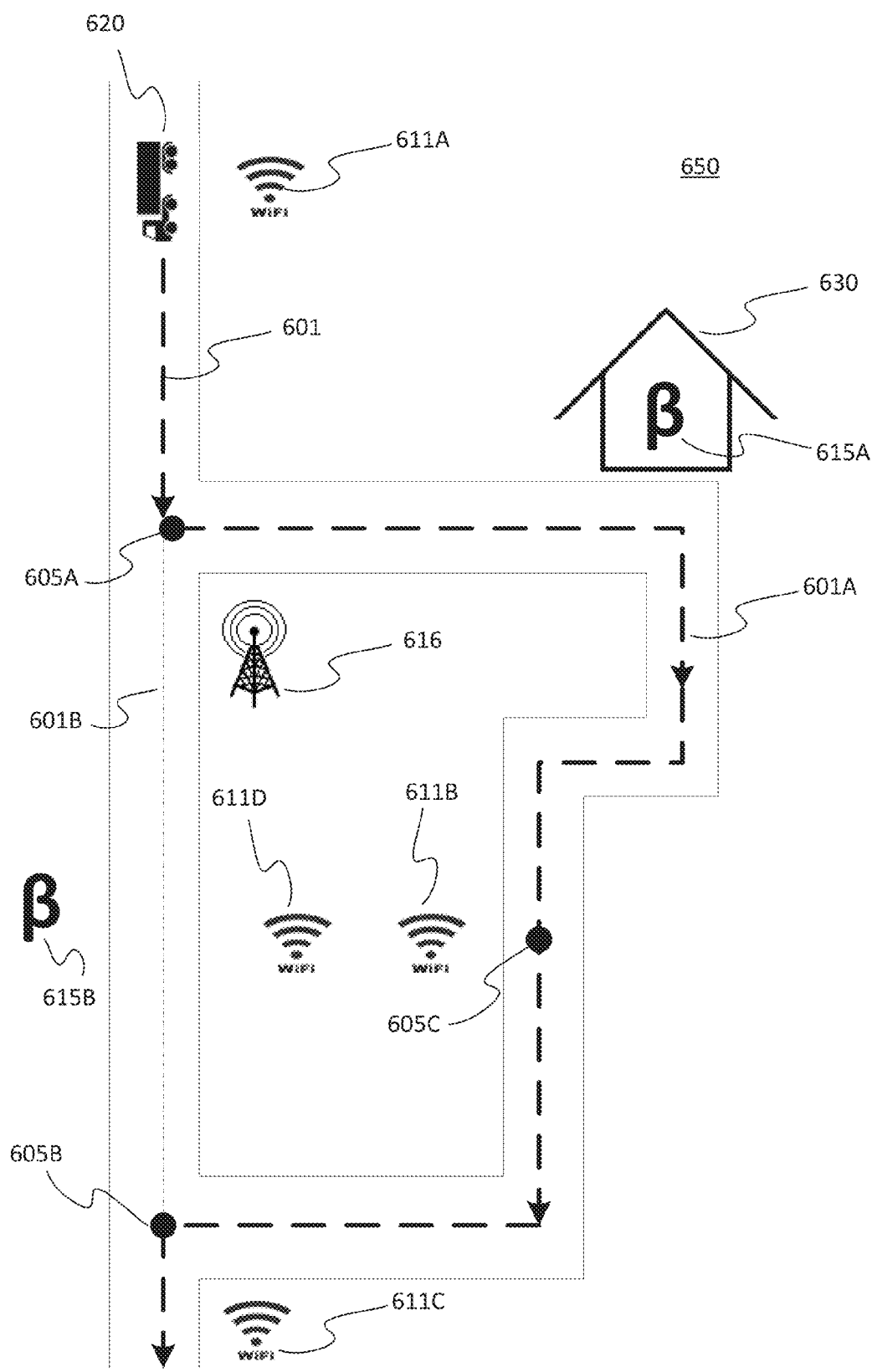
FIG. 6 is an example of a geographic area with a designated route for a traveler.

FIG. 6 is an example of a geographic area 650 with a designated route 601 for a traveler 630. The geographic area 650 has multiple wireless networks including WiFi networks 611A, 611B, 611C, and 611D, Bluetooth® networks 615A and 615B, along with a Cellular network 616. Also, the route 601 includes a path between points 605A and 605B that involves a route segment 601A. The route segment 601A is designed to include a designated stop 620 and a point 605C. The route 601 does not include a path 601B that runs within communicable distance to the Bluetooth® network 615B.

In an embodiment, several of the wireless networks 611A, 615A, and 611C along the route 601 can be designated as waypoint networks. A determination as to whether the traveler 620 traveled the route 601 may be made by verifying the existence of the waypoint networks 611A, 615A, and 611C in a recording of data associated with wireless networks during a particular trip of the traveler 620. In this embodiment, the existence of 611B may not play a role in a determination as to whether traveler 620 traveled the route 601.

In another example, a traveler 620 that follows the route 601 may record data associated with a set of wireless networks 611A, 616, 615A, 611D, 611B, and 611C that would be reflected in an expected recording of data associated with wireless networks along the route 601. The recorded data may be compiled into a list as in Table 1.

TABLE 1

Expected Recording of Data
Associated with Wireless Networks Along the Route

| Type | Name | Time of First Contact | Total Time of Contact | Maximum Strength of Signal |
|---|---|---|---|---|
| WiFi | CityAccess (611A) | 9:00:00 | 0:03:30 | 4 |
| Cellular Carrier | MamaBell Wireless (616) | 9:00:00 | 0:15:00 | 4 |
| Bluetooth® | APT Building Secure (615A) | 9:10:00 | 0:20:00 | 4 |
| WiFi | Mega Bank (611B) | 9:30:00 | 0:05:00 | 4 |
| WiFi | McPowels Guest (611D) | 9:31:00 | 0:01:00 | 1 |
| WiFi | TinyBank (611C) | 9:40:00 | 0:06:30 | 4 |

If the traveler 620 instead follows a different path 601B in Run 1, the traveler will record different data associated with different networks than the expected recording. For example, if a different path 601B is followed a Bluetooth® network 615B will be included in the recording of the traveler 620. This difference may be detected through a comparison between the wireless network names in an expected recording for route 601 and the wireless network names in an actual recording for the traveler 620, as displayed in Table 2. The difference may also be determined through a similarity measure between the expected recording for route 601 and the actual recording for the traveler 620.

TABLE 2

Traveler Run 1

| Type | Name |
|---|---|
| WiFi | CityAccess (611A) |
| Cellular Carrier | MamaBell Wireless (616) |
| Bluetooth® | DBAJewels (615B) |
| WiFi | MegaBank (611B) |
| WiFi | McPowels Guest (611D) |
| WiFi | TinyBank (611C) |

The data associated with the wireless networks may be used in other ways to prove that the route 601 is completed properly. For example, route 601 includes a designated stop 630 that has a proximal Bluetooth® network 615A. If the traveler 620 actually stops at the designated stop 630 the time that the traveler 620 is in communicable distance with the Bluetooth® network 615A will be longer than if the traveler 620 does not stop at the designated stop 630. Table 3 indicates what the recorded data compiled as a list may look like if in Run 2 if the traveler 620 does not stop at designated stop 630. This difference may be detected through a comparison of an expected recording that includes time data with a recording of a traveler 620 that also includes this time data. This type of route error may not be detected if only wireless network names are recorded.

TABLE 3

Traveler Run 2

| Type | Name | Total Time of Contact |
|---|---|---|
| WiFi | CityAccess (611A) | 0:03:30 |
| Cellular Carrier | MamaBell Wireless (616) | 0:15:00 |
| Bluetooth® | APT Building Secure (615A) | 0:01:00 |
| WiFi | MegaBank (611B) | 0:05:00 |
| WiFi | McPowels Guest (611D) | 0:01:00 |
| WiFi | TinyBank (611C) | 0:06:30 |

Another example of how the data associated with the wireless networks may be used involves the recording of wireless networks at a point 605C on route segment 601A. If the traveler 620 follows the route 601, the recording at the specific point 605C may include both WiFi networks 611B and 611D with the respective wireless signal strengths. The proper recording would have one of the WiFi network 611B wireless signal strengths higher than the other WiFi network 611D. If in Run 3 the traveler 620 had taken path 601B, the signal strength of the WiFi network 611D may be stronger than the signal strength of the other WiFi network 611B. This variance from the expected recording may be detected by comparing the strength of signal data associated with the wireless networks. The recorded data for Run 3 is compiled as a list in Table 4.

TABLE 4

Traveler Run 3

| Type | Name | Maximum Strength of Signal |
|---|---|---|
| WiFi | CityAccess (611A) | 4 |
| Cellular Carrier | MamaBell Wireless (616) | 4 |
| Bluetooth ® | DBAJewels (615B) | 4 |
| WiFi | MegaBank (611B) | 1 |
| WiFi | McPowels Guest (611D) | 4 |
| WiFi | TinyBank (611C) | 4 |

From this it can also be seen that the more data associated with wireless networks that is recorded, the higher the probability of detecting route errors. Also, types of route errors may be detected better depending on the type of associated data that is recorded. Table 5 is the data for Run 3, compiled as a list with multiple apparent differences from the expected list in Table 1.

TABLE 5

Traveler Run 3 with More Data

| Type | Name | Time of First Contact | Total Time of Contact | Maximum Strength of Signal |
|---|---|---|---|---|
| WiFi | CityAccess (611A) | 9:00:00 | 0:03:30 | 4 |
| Cellular Carrier | Mama Bell Wireless (616) | 9:00:00 | 0:15:00 | 4 |
| Bluetooth ® | DBAJewels (615B) | 9:05:00 | 0:02:00 | 4 |
| WiFi | Mega Bank (611B) | 9:09:00 | 0:01:00 | 1 |
| WiFi | McPowels Guest (611D) | 9:08:00 | 0:03:30 | 4 |
| WiFi | TinyBank (611C) | 9:10:00 | 0:04:30 | 4 |

As can be seen from a comparison of Table 1 with Table 5, there are multiple differences between the two lists that include different recorded network names, times of contact, and maximum signal strength. Any one of these differences could indicate a general route error or a route error type, as well as could any combination of these differences. A route error type may include a missed stop, a missed leg, an unscheduled stop, or any other type of route error as indicated by the data recorded for a traveler 620 on a trip. A similarity measure applied to the lists displayed in Table 1 and Table 5 may be low, and may indicate that the route was not traveled. For example, the similarity measure may fall below a determined threshold for similarity.

In an embodiment involving the use of a Levenshtein distance algorithm to determine the similarity measure, the two textual strings may be constructed from the expected recording and Run 3 as displayed in Table 6 below.

TABLE 6

Expected Recording and Traveler Run 3 Recording

Textual Strings

| | |
|---|---|
| Expected Recording | WiFi-CityAccess-9:00:00-0:03:30-4:Cellular Carrier-MamaBell Wireless-9:00:00-0:15:00-4:Bluetooth-APT Building Secure-9:10:00-0:20:00-4:WiFi-MegaBank-9:30:00-0:05:00-4:WiFi-McPowels Guest-9:31:00-0:01:00-1:WiFi-TinyBank-9:40:00-0:06:30-4 |
| Run 3 Recording | WiFi-CityAccess-9:00:00-0:03:30-4:Cellular Carrier-MamaBell Wireless-9:00:00-0:15:00-4:Bluetooth-DBAJewels-9:05:00-0:02:00-4:WiFi-MegaBank-9:09:00-0:01:00-1:WiFi-McPowels Guest-9:08:00-0:03:30-4:WiFi-TinyBank-9:10:00-0:04:30-4 |
| Run 4 Recording | WiFi-CityAccess-9:01:00-0:03:30-4:Cellular Carrier-MamaBell Wireless-9:01:00-0:15:00-4:Bluetooth-APT Building Secure-9:11:00-0:19:30-4:WiFi-MegaBank-9:31:00-0:05:00-4:WiFi-McPowels Guest-9:31:00-0:01:57-1:WiFi-TinyBank-9:40:00-0:06:30-4 |

In an embodiment involving the Levenshtein distance formula, let the cost of each of the textual operations of insert a character, delete a character, and exchange a character be 1. Using the Levenshtein distance algorithm it can be seen that a quantified similarity measure between the expected recording and the Run 3 recording would be 32 since Run 3 requires 32 operations to conform to the Expected Recording. Also, a similarity threshold based on a Levenshtein distance embodiment may be determined to be 15. Thus comparing the similarity measure above to the similarity threshold it can be determined that Run 3 did not follow the route 601.

For the case of Run 4 in Table 6, the similarity measure is 9. Thus, comparing the similarity measure above to the similarity threshold of 15 it can be determined that Run 4 did follow the route 601. In other embodiments, using other similarity measures, the similarity threshold may need to be larger than the similarity threshold to determine that the route 601 was followed.

In an embodiment, the similarity measure may also quantify the similarity based on a number of matching wireless networks, as opposed to a text string comparison. The acts of adding, replacing, or deleting a wireless network from a list to match an expected list may be associated with a numerical cost, and the total value for the comparison may be the summed cost values. This total value may then be analyzed to determine if a route 601 was followed. In this embodiment, the analysis may involve comparing the total value to a threshold or allowable value.

The term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium. A digital file attachment to an e-mail or other self-contained information archive or set of archives may be considered a distribution medium that is a tangible storage medium. Accordingly, the disclosure is considered to include any one or more of a computer-readable medium or a distribution medium and other equivalents and successor media, in which data or instructions may be stored.

In an alternative embodiment, dedicated hardware implementations, such as application specific integrated circuits, programmable logic arrays and other hardware devices, can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

Although the present specification describes components and functions that may be implemented in particular embodiments with reference to particular standards and protocols, the invention is not limited to such standards and protocols. For example, standards for Internet and other packet switched network transmission (e.g., TCP/IP, UDP/IP, HTML, HTTP, HTTPS) represent examples of the state of the art. Such standards are periodically superseded by faster or more efficient equivalents having essentially the same functions. Accordingly, replacement standards and protocols having the same or similar functions as those disclosed herein are considered equivalents thereof.

A computer program (also known as a program, software, software application, script, or code) can be written in any form of programming language, including compiled or interpreted languages, and it can be deployed in any form, including as a standalone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

As used in this application, the term 'circuitry' or 'circuit' refers to all of the following: (a) hardware-only circuit implementations (such as implementations in only analog and/or digital circuitry) and (b) to combinations of circuits and software (and/or firmware), such as (as applicable): (i) to a combination of processor(s) or (ii) to portions of processor(s)/software (including digital signal processor(s)), software, and memory(ies) that work together to cause an apparatus, such as a mobile phone or server, to perform various functions) and (c) to circuits, such as a microprocessor(s) or a portion of a microprocessor(s), that require software or firmware for operation, even if the software or firmware is not physically present.

This definition of 'circuitry' applies to all uses of this term in this application, including in any claims. As a further example, as used in this application, the term "circuitry" would also cover an implementation of merely a processor (or multiple processors) or portion of a processor and its (or their) accompanying software and/or firmware. The term "circuitry" would also cover, for example and if applicable to the particular claim element, a baseband integrated circuit or applications processor integrated circuit for a mobile phone or a similar integrated circuit in server, a cellular network device, or other network device.

Processors suitable for the execution of a computer program include, by way of example, both general and special purpose microprocessors, and anyone or more processors of any kind of digital computer. Generally, a processor receives instructions and data from a read only memory or a random access memory or both. The essential elements of a computer are a processor for performing instructions and one or more memory devices for storing instructions and data. Generally, a computer also includes, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio player, a Global Positioning System (GPS) receiver, to name just a few. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, embodiments of the subject matter described in this specification can be implemented on a device having a display, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

While this specification contains many specifics, these should not be construed as limitations on the scope of the invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings and described herein in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, are apparent to those of skill in the art upon reviewing the description.

The Abstract of the Disclosure is provided to comply with 37 C.F.R. §1.72(b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

It is intended that the foregoing detailed description be regarded as illustrative rather than limiting and that it is understood that the following claims including all equivalents are intended to define the scope of the invention. The claims should not be read as limited to the described order or elements unless stated to that effect. Therefore, all embodiments that come within the scope and spirit of the following claims and equivalents thereto are claimed as the invention.

I claim:

1. A method comprising:
   recording data associated with wireless networks encountered while traveling a path through a geographic area;
   comparing, with a processor, the data associated with the wireless networks to a standard recording of wireless networks along a route; wherein the standard recording includes an ordered list of wireless networks identified when traveling the route;
   determining, with the processor, a similarity measure based on the comparing of the data associated with the wireless networks to the standard recording of wireless networks; and
   validating, with the processor, whether the path traveled is the route based on the similarity measure.

2. The method of claim 1, wherein the route is a planned route for a pedestrian.

3. The method of claim 1, wherein the similarity measure comprises a string metric that provides a quantifiable measure of the similarity between two text strings.

4. The method of claim 1, wherein determining whether the route was taken comprises assessing whether the similarity measure was above a minimum threshold.

5. The method of claim 1, wherein the data associated with wireless networks comprises a name for the wireless networks, a wireless signal strength for the wireless networks, and a time the wireless networks were within a communicable distance.

6. The method of claim 1 wherein the standard recording of wireless networks comprises wireless networks designated as essential networks, and the determining a similarity is performed based on the existence of the essential networks in the recording of data associated with wireless networks.

7. The method of claim 1, wherein determining the similarity measure is performed during a time the traveler is scheduled to travel the route.

8. The method of claim 7, further comprising:
communicating an alarm when the similarity measure is below a minimum threshold.

9. The method of claim 1, wherein determining the similarity measure is performed after a scheduled completion of the route.

10. The method of claim 1, wherein the standard recording of wireless networks along the route is derived at least in part from a plurality of previous recordings of wireless networks along the route.

11. The method of claim 1, wherein the standard recording comprises a plurality of segmented recordings that correspond to segments of the route.

12. The method of claim 1, wherein the path traveled is validated without determining a location.

13. An apparatus comprising:
a memory configured to store a recording of data associated with wireless networks encountered while traveling a path from a starting point to a destination point through a geographic area, and a standard ordered recording of data associated with wireless networks encountered from the starting point to the destination point for a route; and
a controller configured to compare the recording to the standard recording to determine a similarity measure and configured to validate whether the path traveled is the route according to the similarity measure.

14. The apparatus of claim 13, wherein the controller is further configured to validate whether the route is traveled by determining whether the similarity measure meets a similarity threshold.

15. The apparatus of claim 14, wherein the controller is further configured to generate an alert when the similarity measure no longer meets the similarity threshold.

16. The apparatus of claim 13, further comprising:
a recorder configured to record the data associated with wireless networks encountered on the route.

17. The apparatus of claim 16, wherein the memory and controller are located remotely from the recorder.

18. A non-transitory computer readable medium including instructions that when executed are operable to:
record a list of wireless networks encountered while traveling a path through a geographic area;
identify a plurality of essential wireless networks in the list;
perform a comparison of the plurality of essential wireless networks to a master list of essential wireless networks for a route; and
validate that the path traveled is the route using the comparison.

19. The medium of claim 18, wherein the instructions for the comparison comprise instructions operable to measure a similarity between the list and the master list, and wherein the similarity is compared to a threshold similarity to prove the execution of the route.

20. The medium of claim 18, wherein the list comprises data related to the wireless networks, and wherein the data related to the wireless networks comprises a network category, a network name, a network strength of signal, or a network time of communicable identification.

* * * * *